United States Patent [19]

Blessing

[11] Patent Number: 4,655,596
[45] Date of Patent: Apr. 7, 1987

[54] WORKPIECE CENTERING APPARATUS AND METHOD

[75] Inventor: Hubert Blessing, Dallas, Tex.

[73] Assignee: Levi Strauss & Co., San Francisco, Calif.

[21] Appl. No.: 761,064

[22] Filed: Jul. 31, 1985

Related U.S. Application Data

[63] Continuation-in-part of Ser. No. 546,564, Oct. 28, 1983, abandoned.

[51] Int. Cl.$^4$ .............................................. G01B 11/00
[52] U.S. Cl. .................................................. 356/372
[58] Field of Search ................ 356/375, 372, 384–387; 250/560, 561; 223/1, 37

[56] References Cited

U.S. PATENT DOCUMENTS 3,548,196  12/1970  Minasian ............................ 250/224

FOREIGN PATENT DOCUMENTS 1253994  11/1971  United Kingdom ................ 356/384

OTHER PUBLICATIONS

Echelmeier, *IBM Technical Disclosure Bulletin*, vol. 16, No. 3, Aug. 1973, p. 975.

*Primary Examiner*—F. L. Evans
*Attorney, Agent, or Firm*—Philip M. Shaw, Jr.

[57] ABSTRACT

A workpiece is centered on a transparent work surface by optically transposing one edge of the workpiece to a point beneath the work surface and adjacent the opposite edge of the workpiece and then sliding the workpiece sideways until the transposed edge image is aligned with the actual second edge of the workpiece.

4 Claims, 2 Drawing Figures

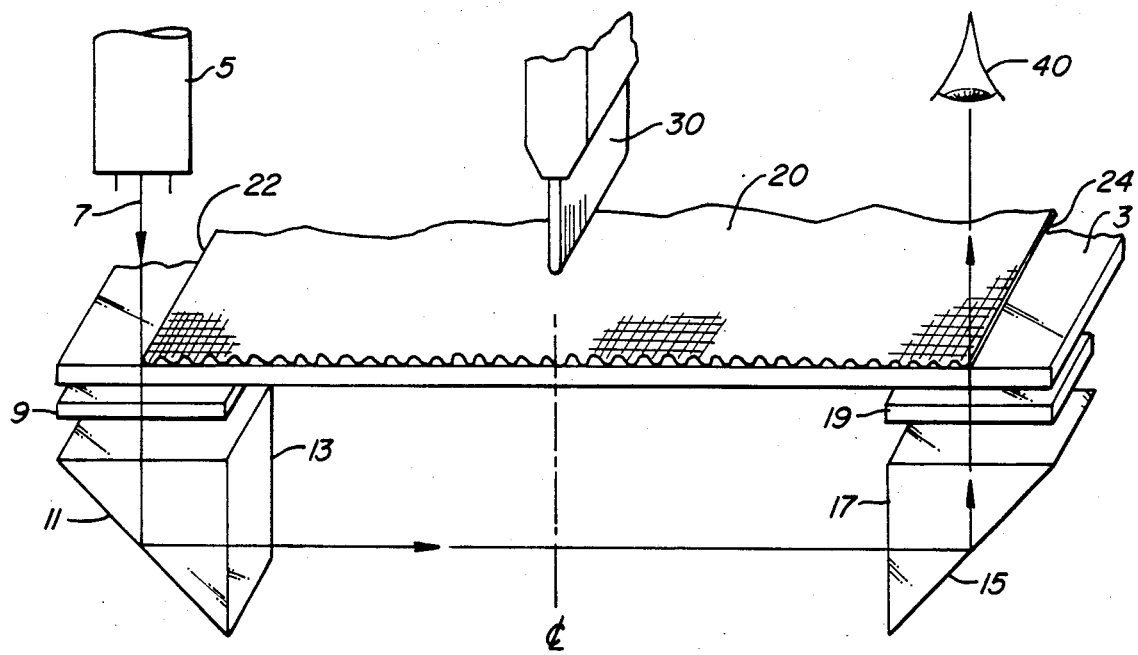
FIG._1.
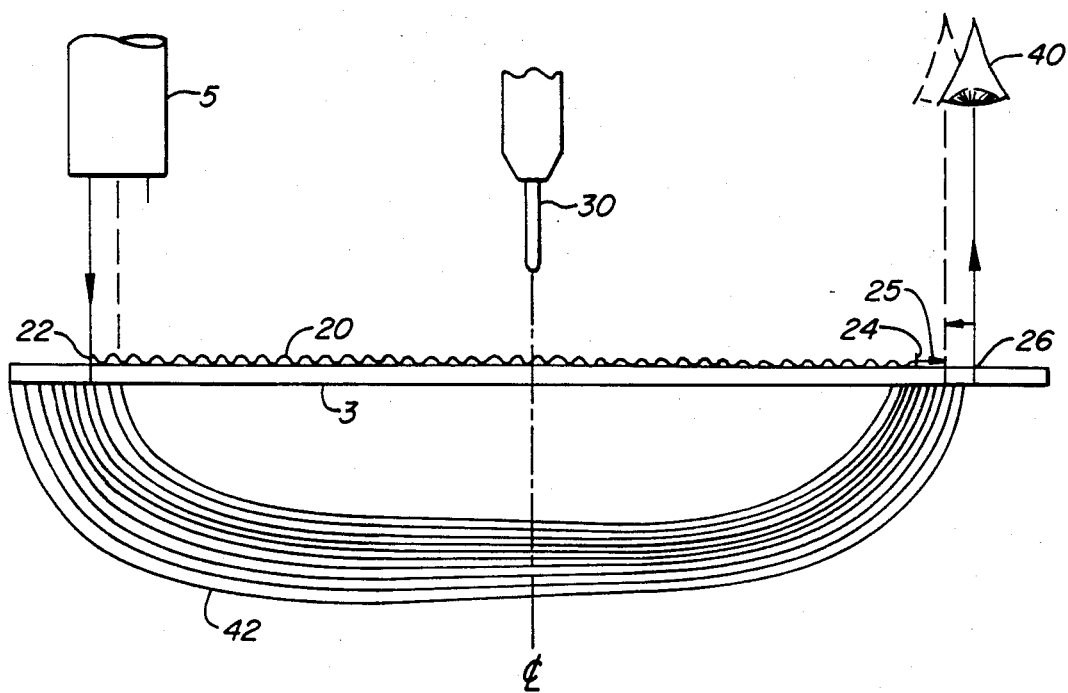
FIG._2.

WORKPIECE CENTERING APPARATUS AND METHOD

CROSS-REFERENCE TO RELATED APPLICATION

This is a continuation-in-part of my copending patent application entitled OPTICAL COMPARATOR AND METHOD FOR USING THE SAME, Ser. No. 546,564, filed Oct. 28, 1983, now abandoned.

TECHNICAL DESCRIPTION

The apparatus of this invention relates generally to the garment industry but is not limited thereto, and in particular it relates to an apparatus and method for aiding an operator or a machine in dividing a piece of fabric or other material about a reference line, such as the centerline of the fabric. The apparatus is particularly useful when the fabric to be divided is by design or tolerance of a variable width.

BACKGROUND ART

It is often essential that a workpiece be divided, folded, or located along its theoretical centerline prior to the introduction of the workpiece to a work station for sewing or for affixing (stitching) fabric pieces, such as pockets, zippers, etc. When the workpiece is of variable width, as is often the case, it is quite difficult and time consuming to align the workpiece with a desired reference line, such as the centerline, and to maintain that alignment using known devices. The prior art devices used for this purpose become even more time consuming and difficult to manage, and thus less efficient when the volume of the fabric to be worked on is great, such as is the case in large garment (i.e. pants and shirts) manufacturing plants.

The known prior art devices serving this purpose consist of mechanical guiders which are designed to span the width of the fabric. Naturally, such mechanical means must be constantly changed and adjusted to accept different sizes of workpieces. Such means are obviously undersirable, particularly in large garment manufacturing plants, since these mechanisms are unable to give accurate dimensional repeatability. Such adjustments are avoided with the apparatus of the present invention. Also, automated devices such as robots and/or servo driven mechanisms often need width measuring sensors and adjustable mounts to accommodate certain types and sizes of garments. This too is eliminated with the apparatus of the present invention.

DISCLOSURE OF THE INVENTION

Based on the foregoing shortcomings of the prior art devices, it is obvious that there is a need in the garment industry for a better means of determining and maintaining a fabric workpiece, particularly one of variable width, about a reference point such as the centerline. It is desirable to have a device which eliminates the need for mechanical guiders or banking devices and which allows the operator of such device to find the theoretical centerline of the fabric regardless of width variations.

Accordingly, I have invented an apparatus and method for optically dividing a flat workpiece, including one with variable widths, about a reference point, such as the centerline. The apparatus employs a transparent support surface for supporting the workpiece and for transmitting light from a light source through the transparent surface and optical means, such as a fiber optic bundle, located below the surface to form an image of one edge of the fabric workpiece directly beneath the opposite edge of the workpiece and viewable through the transparent support surface. The fabric workpiece is manipulated by the worker or a servo mechanism between the two edges of the transparent surface, until the projected image of the first edge of the fabric is aligned with the actual second edge of the workpiece. When the two "edges" appear to be in alignment, the fabric workpiece has been divided about its centerline or other desirable reference point.

It is therefore an object of this invention to provide an apparatus and a method for dividing and maintaining a fabric workpiece about a predetermined reference point, such as the theoretical centerline, where the operation of the apparatus is not dependent upon the mechanical operations of the traditional side guiders or banking devices.

It is another object of this invention to provide an apparatus and method by which the operator of an automatic mechanism can divide fabric by manipulating the fabric workpiece instead of making mechanical adjustments to the apparatus itself.

BRIEF DESCRIPTION OF THE DRAWINGS

FIG. 1 is a diagrammatic side view of the apparatus of the invention; and

FIG. 2 is a diagrammatic side view of an alternative embodiment of the apparatus of the invention illustrating the projected image of one edge of the fabric workpiece, when the workpiece is not aligned with the edge of the support surface.

BEST MODE FOR CARRYING OUT THE INVENTION

The apparatus of the invention is illustrated in FIG. 1. When in operation, a piece of fabric 20 is introduced to the apparatus on a transparent transport surface 3. The support surface has side edges spaced apart by a total distance exceeding the width of the workpiece. The left edge 22 of the fabric 20, as viewed in FIG. 1, is positioned on support surface 3 such that, when light rays 7 from light source 5 (which may be capable of emitting light in the visible and/or nonvisible ranges) are directed toward surface 3 and fabric edge 22, an image of edge 22 is focused on to reflective surface 11 by lens 9. Ideally, lens 9 and reflective surface 11 are positioned with respect to each other and with respect to light source 5 such that the light being directed by lens 9 onto surface 11 strikes surface 11 at a 45° angle of incidence. The image of fabric edge 22 is formed at the focal center of reflective surface 11.

The image on reflective surface 11 is again reflected onto a second reflective surface 15 which is perpendicular to surface 11. The reflective surface 15 is located generally adjacent the second edge 24 of the workpiece 20. This reflected image is then focused by a lens 19 to be viewable, by an operator 40, looking down through the support surface 3. Note that the image is now inverted from the original orientation, i.e. it is upside down compared to the original image of edge 22 to the viewer 40 looking across the workpiece 20. The operator next manually aligns the workpiece laterally until the image of fabric edge 22 can be observed by an observer 40, or other reading device such as a photocell or charge coupled device (CCD) camera.

Once the image of fabric edge 22 can be observed at the right edge of transport surface 3, an attempt is made to align the image of fabric edge 22 with the actual fabric edge 24 so that the image of fabric edge 22 and fabric edge 24 will be coincidental. When this has occurred, the fabric 20 will have been centered with respect to the transport surface's edges such that a further operation (such as folding by device 30 or stitching, etc.) may be performed on fabric 20.

Lens 9 is ideally a fully transparent lens to enable sufficient light from source 5 to be directed onto reflective surface 11 to form an image of edge 22. On the other hand, lens 19 is ideally a frosted or partially transparent lens to enable the image reflected from surface 11 onto surface 15 to be directed in one direction by lens 19 but so as not to allow an image of edge 24 to be directed by lenses 19 and 9 and reflective surfaces 15 and 11 back to the underside of surface 3 where it would be reflected, with the result that the superimposed images would cause great confusion of the viewer 40. While a frosted lens is desirable in the position of lens 19 to accomplish the desired goal of this invention, it is to be understood that a transparent lens would clearly be within the spirit and scope of the claims of this invention.

Reflective surfaces 11 and 15 are shown as surfaces of prisms 13 and 17 respectively since ideally a prism is employed in this embodiment to reflect the image which is formed by lens 9, onto surface 15 and then onto lens 19, but it is to be understood that a single mirrored or other reflective surface is equally suitable in this embodiment and is clearly intended to fall within the spirit and scope of the claims of this invention.

Similarly, as shown in FIG. 2, the lens and mirrored prism periscope arrangement depicted in FIG. 1 for conveying the inverted image of edge 22 to beneath the transparent surface 3 on the opposite side of the workpiece can be accomplished by other suitable means such as a fiber-optic bundle 42. FIG. 2 illustrates generally the same apparatus of FIG. 1 and like parts of the apparatus are referred to by the same reference numeral but with a subscript. FIG. 2 also illustrates what happens when the fabric piece 20 is not correctly positioned on transport surface 3. The same procedure is followed whether the apparatus of FIG. 1 or FIG. 2 is utilized.

Light from source 5 is transmitted through surface 3 and the image of edge 22 is directed by a bundle of optic fibers 42 to form an inverted image of fabric edge 22 generally beneath the left edge 24 of the fabric piece 20. The fabric piece 20 must then be manipulated, either manually or by a guide wheel, laterally over transport surface 3, as indicated by the arrow 25, until the image of fabric edge 22 appears to the observer at position 40 to be aligned with the actual fabric edge 24. When this happens, the fabric piece 20 has been centered with respect to the edges of the transport surface 3 such that an operation by device 30 can be performed on fabric 20.

In the above described embodiments, the edge image conveying means (i.e. the periscope arrangement of lenses 9 and 19 and the prisms 13 and 17 or the fiber optic bundle 42) are centered with respect to the transport surface 3 and hence the workpiece also becomes centered, by proper manipulation, with respect to the edges of surface 3. Obviously, the spacing between the prisms 13, 17 or the ends of the fiber optic bundle 42 must slightly exceed the width of the workpiece, as shown in the figures, or else registration becomes impossible. It should be understood, however, that the workpiece is actually being centered with respect to the edge image conveying means and that in other embodiments such means might not be centered with respect to the transport surface 3. Also, although the light source 5 and the viewer or sensor 40 are described as being above the work surface 3, with the edge image conveying means being below the surface 3, it should be understood that these positions are relative and could be reversed so that the light source 5 and viewer or sensor 40 are below the surface 3 and the edge image conveying means is above the surface 3.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

I claim:

1. An apparatus for centering a workpiece about a predetermined reference line comprising:
    a transparent surface, having side edges spaced apart on opposite sides of the reference line by a total distance greater than the width of the workpiece;
    a source of light at one side of the transparent surface for illuminating a first edge of the workpiece;
    optical means for transmitting an inverted image of the first edge of the workpiece, which is located nearest one side of the transparent surface, to the opposite side of the transparent surface and for displaying said inverted image adjacent a second edge of the workpiece which is opposite to the first edge, whereby manual manipulation of the workpiece about the reference line will cause the second edge to be superimposed and coincident with the displayed image of the first edge, thereby indicating that the workpiece is centered with respect to the reference line.

2. Workpiece centering apparatus as recited in claim 1 wherein the optical means comprises a plurality of reflecting surfaces arranged such that the reflecting surfaces reflect the first edge image through a total of ninety degrees so as to invert the first edge image.

3. Workpiece centering apparatus as recited in claim 1 wherein the optical means is comprised of a bundle of optical fibers, with one end of the bundle being positioned adjacent one side edge of the workpiece and the other end of the bundle being positioned adjacent the directly opposite side edge of the workpiece.

4. A method for optically dividing a workpiece about a predetermined reference line comprising the following steps:
    transporting a fabric workpiece over a support surface which is wider than the workpiece;
    illuminating a first edge of the workpiece and forming an image of a first edge of said workpiece;
    optically conveying the edge image to a point adjacent a second opposite edge of the workpiece, and displaying it inverted relative to the actual edge; and
    manipulating the workpiece across the support surface until the inverted image of the first edge of the fabric workpiece becomes aligned with the second edge of said workpiece.

* * * * *